UNITED STATES PATENT OFFICE.

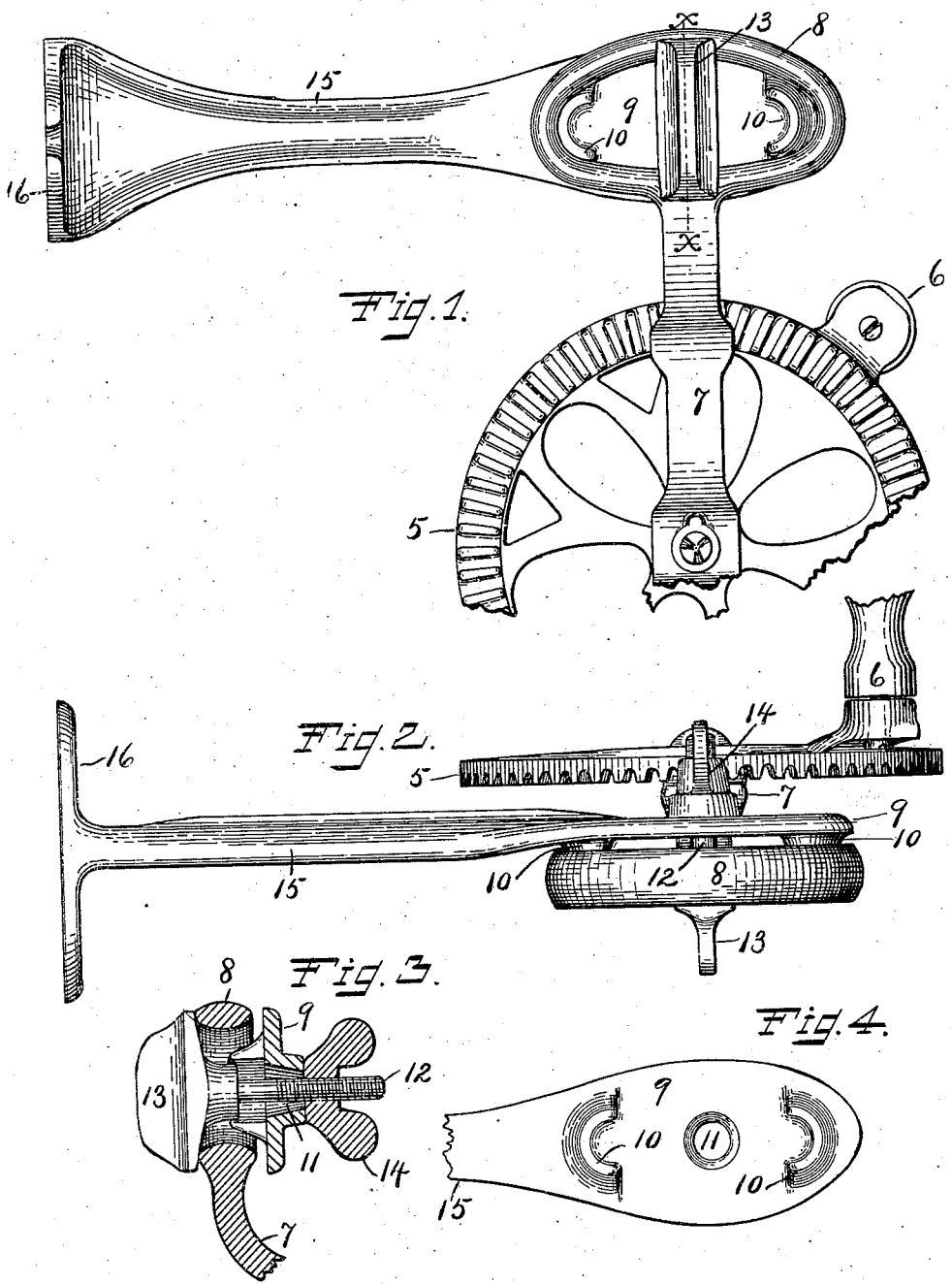

GEORGE F. BAILEY, OF NEW BRITAIN, CONNECTICUT, ASSIGNOR TO TAPLIN MANUFACTURING COMPANY, OF NEW BRITAIN, CONNECTICUT, A CORPORATION.

HOLDING-BRACKET FOR EGG-BEATERS.

No. 845,326.  Specification of Letters Patent.  Patented Feb. 26, 1907.

Application filed October 30, 1906. Serial No. 341,300.

*To all whom it may concern:*

Be it known that I, GEORGE F. BAILEY, a citizen of the United States, residing at New Britain, in the county of Hartford and State of Connecticut, have invented certain new and useful Improvements in Holding-Brackets for Egg-Beaters, of which the following is a specification.

My invention relates to improvements in brackets for holding egg-beaters; and the main object of my improvement is to provide a bracket that may be fastened to a rigid vertical support or side wall and to which bracket the ordinary handle of an egg-beater can be secured for holding the machine instead of having to hold it by one hand.

In the accompanying drawings, Figure 1 is a side elevation of my bracket together with a portion of an egg-beater secured to the said bracket through the handle of the said beater. Fig. 2 is a plan view of the same. Fig. 3 is a sectional view of the same on the line $x$ $x$ of Fig. 1 with the T-bolt in side elevation. Fig. 4 is a side elevation of the outer end of the bracket with the T-bolt and egg-beater removed.

The egg-beater, herein shown as broken off, is of an ordinary or well-known type, having a driving-wheel 5, crank-handle 6, frame 7, and a ring or eye form of handle 8. These handles are generally made in substantially the form of an oval ring as seen in side view and as shown in Fig. 1. The bracket, which I call the "Victor handy bracket," is provided at its outer end with a head 9 of a form corresponding, as seen in side view, to the general oval form of the handle 8. I form one side of this head so as to partially fit the handle 8 from one side preferably with lugs 10, that enter the eye or opening in the handle 8 from one side and bear on its inside near each end, as shown. This head 9 is centrally perforated, as at 11, to let the body 12 of the T-bolt pass through it, while the head 13 of the said bolt is long enough to span the eye of the handle 8 on that side which is farthest from the head 9. A nut 14, preferably a thumb-nut, is placed on the threaded end of the T-bolt on the farther side of the head 9 from the head 13 of the said T-bolt. When the head 13 of the T-bolt lies parallel with the longest diameter of the handle 8, it may be passed therethrough for convenience of securing the egg-beater to the bracket and removing it therefrom without taking off the nut 14.

By placing the egg-beater in the relation to the bracket shown in Figs. 1, 2, and 3 and tightening up the nut the bracket and beater may be firmly fastened or clamped together. By unscrewing the nut and either removing the T-bolt or turning its head one-quarter of a revolution on its axis the beater and bracket may be detached from each other.

The head 9 of the bracket is formed on one end of a suitable bracket arm or body 15, and a bracket-plate 16 is formed at the other end of the said body, so that the bracket may be fastened by means of ordinary fastenings—as, for example, screws—to a side wall or other rigid vertical support. When the bracket is thus fastened and the beater secured to the bracket by the T-bolt and nut, which constitute means for clamping the bracket and egg-beater handle together, the operator can turn the crank-handle with one hand and hold the bowl or vessel containing the matter to be agitated in the other hand, which is entirely free to use as desired, because it is unnecessary to touch the beater except to turn the crank. The bracket may be used in connection with a suitable shelf to rest the vessel upon, while the bracket is secured in place at the proper relative position to the said shelf. If desired, when the bracket and egg-beater are clamped together, as shown, and the bracket is not attached to any support the bracket-body may serve as a handle for the egg-beater and it will be easier for the hand to hold than is the handle 8.

I am aware that a prior patent shows a table-bracket for egg-beaters with a spring-pressed holder fitted to the upper end of the handle for holding a pivot at the lower end of the egg-beater in a bearing in a vessel or bowl that rests upon the table to which the bracket is applied, and the same is hereby disclaimed.

It is apparent that some changes from the specific construction herein disclosed may be made, and therefore I do not wish to be understood as limiting myself to the precise form of construction shown and described.

but desire the liberty to make such changes in working my invention as may fairly come within the spirit and scope of the same.

I claim as my invention—

A holding-bracket for an egg-beater having a head provided with a central hole and side lugs, and a T-bolt and nut, passing through the said head, the said lugs being fitted to the interior of the ends of an egg-beater handle, and the said T-bolt being fitted to engage one side of the said handle and to press the said handle against the said lugs, when the nut on the said bolt is tightened up.

GEORGE F. BAILEY.

Witnesses:
  GEO. J. AUGERBOWER,
  S. HELEN PHILLIPS.